3,139,436
N-2-BENZOTHIAZOLYLSULFONYL-
BENZAMIDE
John B. Bicking, Lansdale, Pa., assignor to Merck & Co., Inc., Rahway, N.J., a corporation of New Jersey
No Drawing. Original application June 9, 1958, Ser. No. 740,579. Divided and this application June 13, 1960, Ser. No. 35,428
1 Claim. (Cl. 260—306.6)

This invention relates to N-acylsulfonamides and to the preparation thereof. Such compounds have the generic formula

R—SO$_2$NQCO—R' in which R and R' are organo groups, and in which Q is selected from the group consisting of hydrogen and salt-forming metals such as sodium and potassium. Numerous compounds of this class have been employed as dyestuffs, bacteriostatic agents, moth-proofing agents, catalysts, inhibitors in polymerizable mixtures, disinfectants, and for a variety of other purposes.

In the development of the present invention, the surprising discovery was made that certain of these N-acylsulfonamides are effective in regulating the sugar content of the blood of mammals, and in regulating the Respiratory Quotient (R.Q.). Symptoms such as excessively high sugar content of the blood and low Respiratory Quotient can be considered as diagnostic of deficiency in the utilization of carbohydrates by the body, and can be modified by treatment with what are designated as "hypoglycemic agents." However, the superiority of insulin among the hypoglycemic agents has been so outstanding that until recently only a few specialists have been aware that other hypoglycemic agents have been investigated. There has long been some dissatisfaction with insulin because of the need to administer it by injection. There has been a long standing demand for a synthetic chemical compound which could be employed for lowering the blood sugar level and/or increasing the Respiratory Quotient of animals, and this demand has existed apart from the demand for an insulin substitute which could be fully equivalent to insulin.

Obese and elderly dogs sometimes develop diabetes mellitus, and previously it has been standard practice to treat such diabetes mellitus in dogs by a combination of diet control and daily injections of insulin. There has been a long standing demand for a drug which would be suitable for oral administration and capable of lowering the blood sugar level in animals, whereby veterinarians treating animals with diabetes mellitus could employ pills instead of injections.

The investigation of the effectiveness of N-acylsulfonamides having the above structural formula as hypoglycemic agents disclosed: (a) that certain N-acylsulfonamides possessed activity as hypoglycemic agents; and (b) that the correlation between the chemical structure of the R and R' groups and the effectivness of the compounds as hypoglycemic agents did not appear to fall into any recognizable pattern, but instead, was quite specific to each specific compound. Those compounds which possess sufficient hypoglycemic activity to be of interest are distinguishable from each other by differences in activity and/or by differences in usefulness. Thus some of the compounds have advantages by reason of ease of preparation, availability of raw materials, solubility, and the like. In grouping together those N-acylsulfonamides which are of particular interest, the members of the group share in common the classification as N-acylsulfonamides, and the classification as effective hypoglycemic agents. Eventually a better understanding of the reasons why certain N-acylsulfonamides do and certain N-acylsulfonamides do not possess significant hypoglycemic activity may be appreciated, but presently, because of the remarkable specificity and unpredictability as regards such compounds for such purpose, it is more convenient to place the major emphasis upon the specificity of the useful compounds and upon the membership of such useful compounds in the hypoglycemic agent class.

In accordance with the present invention, the blood sugar level of a mammal is lowered and/or the Respiratory Quotient of a mammal is increased by treating the mammal with a small dosage of N-2-benzothiazolylsulfonyl-benzamide.

The subject matter of the present invention can be further clarified by reference to several groups of data which are for convenience designated as examples without regard to whether they illustrate embodiments of the present invention.

EXAMPLE 1

Cyclohexanesulfonamide is prepared from cyclohexylbromide by: bringing about a reaction between cyclohexylbromide and thiourea to form the hydrobromide salt of S-cyclohexylisothiourea; converting said salt to cyclohexanethiol by treatment with a basic aqueous solution; oxidizing and chlorinating the cyclohexanethiol by reaction with chlorine in acetic acid to form cyclohexylsulfonyl chloride; and treating the cyclohexylsulfonyl chloride in liquid ammonia to form cyclohexanesulfonamide.

To 500 ml. of ethanol, 326 g. (2 moles) of bromocyclohexane and 145 g. (1.9 moles) of thiourea are added and refluxed for about 48 hours. The ethanol is removed from the reaction mixture under reduced pressure, and then 300 ml. of hot water is added, and the solvent again removed under reduced pressure, thereby precipitating a solid hydrobromide salt of S-cyclohexylisothiourea.

This solid is dissolved in 500 ml. of hot water, to which small amounts of 40% sodium hydroxide solution are added, care being taken not to add enough base to dissolve the cyclohexanethiol which forms as an oily layer. The cyclohexanethiol is dissolved in 1000 ml. of 70% acetic acid. The solution is cooled to below 10° C. and treated with chlorine as rapidly as possible without exceeding 10° C., using about 3.3 moles (a slight excess) of chlorine per mole of cyclohexanethiol. After dilution of the reaction mixture with 1000 ml. of ice water, the cyclohexylsulfonyl chloride formed is extracted three times with 400 ml. of ether. The combined extracts are washed with an aqueous solution of sodium hydrosulfite to remove any traces of unreacted chlorine, and then with cold water. The solution is dried over sodium sulfate. The ether is removed, leaving cyclohexylsulfonyl chloride. This compound is added carefully to 400 ml. of liquid ammonia, and the excess ammonia is evaporated. The solid is dissolved in 1000 ml. of hot benzene and diluted with 700 ml. of hexane, and the solution is cooled to permit the precipitation of 77.4 g. (0.48 mole) of cyclohexanesulfonamide, representing a 25% yield based upon the thiourea employed.

The reaction between an organic compound containing a sulfonamide group as the only reactive group and an organic compound containing an acyl chloride as the only reactive group when conducted in the presence of an excess of weak tertiary amine capable of combining with the hydrogen chloride, constitutes a reliable method for preparing the corresponding N-acyl sulfonamides. The purity of the N-acylsulfonamides is controlled predominantly by assuring the purity of the sulfonamide and acyl chloride participating in the final reaction. High purity is established by the sharpness of the melting point of the N-acyl sulfonamide. The proof of the structure of the N-acyl sulfonamide is established by the proof of the structure of the reactants plus an analysis of some of the elements in the end product of the reaction. The generic equation for this reliable reaction can be expressed as follows:

RSO$_2$NH$_2$+R'COCl+Tertiary Amine→
  RSO$_2$NHCOR'+Tertiary Amine Hydrochloride

EXAMPLE 2

N-cyclohexylsulfonyl-p-anisamide is prepared by the reaction of cyclohexanesulfonamide and anisoylchloride in pyridine.

A solution is prepared by dissolving 11.4 g. (0.07 mole) of cyclohexanesulfonamide in 30 ml. of pyridine. An acid chloride is prepared by heating for 30 minutes on a steam bath a mixture of 11.4 g. (0.075 mole) of p-anisic acid and 9.5 g. (0.08 mole) of thionyl chloride, which acid chloride then is mixed with the pyridine solution and heated for 1.5 hours on the steam bath, thus forming a solution of the N-anisoylcyclohexanesulfonamide. This solution is cooled, diluted with 200 ml. of water, and acidified with hydrochloric acid. The resulting precipitate may be further purified by forming a precipitate of the sodium salt in 70 ml. of 5% sodium hydroxide solution, dissolving such salt in 200 ml. of water, and acidifying to precipitate the N-anisoylcyclohexanesulfonamide. This may be further purified by several recrystallizations from acetic acid. By this procedure, 8.3 g. (0.028 mole) of N-cyclohexylsulfonyl-p-anisamide are prepared, representing a 37% yield based upon the cyclohexanesulfonamide employed. The N-cyclohexylsulfonyl-p-anisamide has a melting point of 158° C. The compound has the formula C$_{14}$H$_{19}$NO$_4$S and is calculated to contain: 4.71% N; 56.55% C; and 6.44% H. The analysis found is: 4.68% N; 56.77% C; and 6.45% H. Such data are within experimental accuracy, and confirm the composition of the compound to be as calculated.

The compound is soluble and stable in dilute alkali, such as an aqueous solution of about pH 11.5, but the sodium salt of the compound will precipitate if the alkali concentration is raised above about 1% sodium hydroxide. The compound may be conveniently utilized either in tablet form or as an aqueous alkaline solution consisting predominantly of Sorenson's buffer (pH 7.8).

In establishing that the compound of this invention possesses hypoglycemic properties, reliable data are obtained by testing healthy animals to determine the extent of lowering of the blood sugar level and/or the extent of increasing the Respiratory Quotient, and it is not necessary to restrict the testing to animals having an illness causing an abnormally high blood sugar level and/or abnormally low Respiratory Quotient.

An established procedure for testing compounds for an abnormally high blood sugar level is as follows: A group of eight young adult Holtzman rats weighing about 150 g. are fasted about 18 hours and the compound is administered in the designated dosages as an aqueous solution of its alkali metal salt. Concentrations are adjusted to give about 2 ml. per 100 g. of body weight. A blood sample is withdrawn from the tip of the tail before and two hours after administration of the compound, and the percentage of reduction of the blood sugar level two hours after oral administration of the compound is noted. The blood sugar is determined by the standard colorimetric method using an arsenomolybdate color reagent, as described by N. Nelson, J. Biol. Chem. 153, 375 (1944).

For each rat, the blood sugar level is measured as mg./100 ml. of whole blood and the value prior to treatment is treated as 100% and subsequent measurements are expressed as a percent reduction of such initial values. Each dosage is evaluated by averaging the percent reduction in eight rats.

In establishing that N-2-benzothiazolylsulfonyl-benzamide is effective in increasing the Respiratory Quotient of animals, fasting young adult male rats are placed in a chamber, and air from the chamber is analyzed in the sonic gas analyzer. The Respiratory Quotient is measured before and 40 minutes after the oral administration of the stated doses of the compound to the rats. Table I shows the resulting data.

*Table I*

EFFECT OF N-2-BENZOTHIAZOLYL-SULFONYL-BENZAMIDE RESPIRATORY QUOTIENT

| Dose, mg./kg. | Respiratory Quotient | | Increase |
|---|---|---|---|
| | Before | After | |
| 250 | 0.79 | 0.82 | 0.03 |

At oral dosages as high as 250 mg./kg. in rats, the acute toxicity, if any, is not noticeable.

EXAMPLE 3

A batch of tablets are prepared so that each tablet contains:

| | Mg. |
|---|---|
| N-2-benzothiazolylsulfonyl-benzamide | 50 |
| Lactose | 25 |
| Dicalcium phosphate | 25 |
| Cornstarch | 7 |
| Acacia gum | 2 |
| Dispersion of 12% starch in water | 2 |
| Talc | 2 |
| Magnesium stearate | 0.5 |
| Total | 113.5 |

All of the ingredients except the magnesium stearate are ground together in a granulator, and the thus prepared powder is then mixed with magnesium stearate and pelletted. Such tablets are useful for administering controlled dosages of the compound to animals in order to control the blood sugar concentration and/or the Respiratory Quotient.

The N-2-benzothiazolylsulfonyl-benzamide of this invention, prepared by the method described in Example 2, has M.P. 154–156° C.

This application is a division of my copending application, Serial No. 740,579, filed June 9, 1958, now abandoned.

What is claimed is:
N-2-benzothiazolylsulfonyl-benzamide.

References Cited in the file of this patent
UNITED STATES PATENTS

| 2,595,334 | Clapp et al. | May 6, 1952 |
| 2,891,960 | Ruschig et al. | June 23, 1959 |
| 3,019,245 | Novello | Jan. 30, 1962 |

FOREIGN PATENTS

| 620,778 | Great Britain | Mar. 30, 1949 |
| 692,651 | Great Britain | June 10, 1953 |